Feb. 17, 1953  M. L. GREENOUGH  2,629,004
ELECTRICAL MICROMETER
Filed June 10, 1947  4 Sheets-Sheet 1

*INVENTOR.*
MAURICE L. GREENOUGH
BY
*Atty.*

Feb. 17, 1953   M. L. GREENOUGH   2,629,004
ELECTRICAL MICROMETER
Filed June 10, 1947   4 Sheets-Sheet 2

INVENTOR.
MAURICE L. GREENOUGH
BY
*[signature]*
Atty.

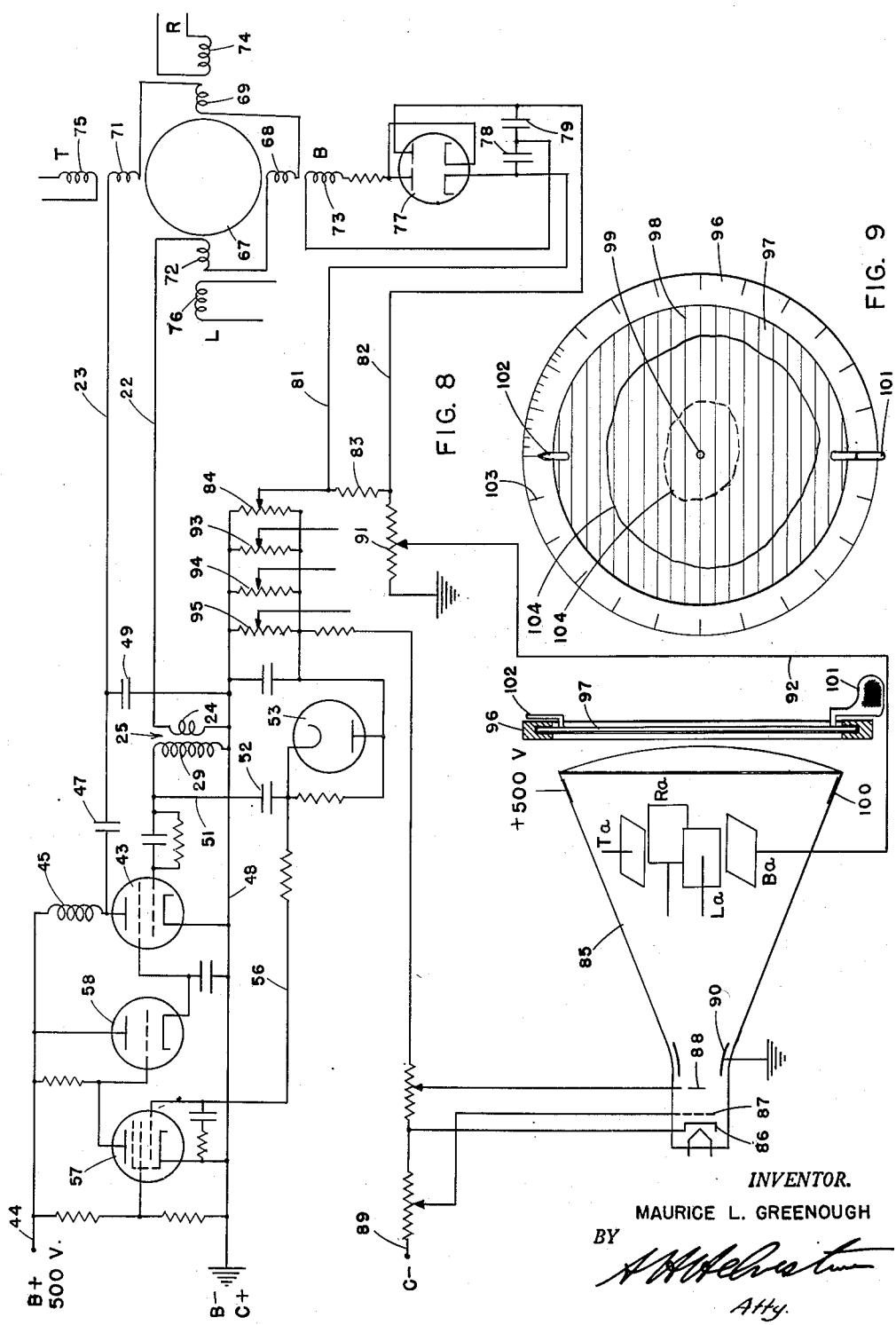

Patented Feb. 17, 1953

2,629,004

UNITED STATES PATENT OFFICE 2,629,004

ELECTRICAL MICROMETER

Maurice L. Greenough, Washington, D. C., assignor to the United States of America as represented by the Secretary of the Navy Application June 10, 1947, Serial No. 753,791
23 Claims. (Cl. 175—183)

(Granted under Title 35, U. S. Code (1952), sec. 266)

The present invention relates to electrical micrometers and more particularly to an electrical micrometer for measuring small distances in those instances in which it is not possible to make either mechanical or electrical connections at both limits of the distance to be measured.

Electrical micrometers are known in the art which rely on variations in capacitance or inductance or which employ optical systems to produce an indication which varies in some known relation to the distance being measured. Each of these methods of measurement presents certain disadvantages.

In the case where capacitance between two plates is employed for measuring the thickness of an object placed between the plates, the dielectric constants of various materials are different and therefore calibration of an instrument relying on capacity variations is very difficult. Furthermore, the plates are required to be exactly parallel for accuracy and electrical connections must be made to both plates of the capacitance.

While most inductive systems can be employed without the necessity of making electrical connections to both sides of the object to be measured, they generally depend on the reluctance of a gap of nonmagnetic material and therefore require a relatively thick magnetic plate on one side of the object to be measured. This places a limitation on the upper limit of frequency response from both the weight and magnetic aspects.

Optical systems have been employed in the measurements of large displacements but generally require mirror systems and cannot be used to measure the thickness of opaque objects. Furthermore, their accuracy is dependent upon the somewhat variable characteristics of photocels.

The present invention avoids the disadvantages noted above by the employment of an entirely distinct method of operation which contemplates the use of a radio frequency field as a means for measuring small distances in non-conducting media, such as insulation, oil films, or air gaps, from one side thereof thereby eliminating the necessity for an electrical connection to the other side. The method broadly comprises placing a non-magnetic electrically conducting surface at one limit of the medium to be measured, generating a radio frequency field which passes through the medium to the conducting surface, and measuring the difference in the intensity of the resultant fields at both limits of the medium to be measured. If an effect of the resultant field at the limit of the medium abutting the conducting surface is compensated so as to reduce such effect of the resultant field to zero at this limit, the compensated measurement at the other limit of the medium by itself will indicate the thickness of the medium. It has been found that for relatively small distance measurements, the field intensity at the limit of the medium furthest from the conducting surface varies linearly with respect to distance from the conducting surface so that it is possible to employ this method with a direct reading instrument without recourse to calibration charts.

Because of the linear response, this method may be employed for various purposes such as thickness measurements, measurement of the vibration of a rotating shaft, and in a phonograph pick-up device as will be hereinafter disclosed in greater detail.

An object of the present invention is the provision of an electrical method of measuring micrometric thicknesses of electrically non-conducting media.

Another object is to provide apparatus capable of measuring micrometric thicknesses of electrically non-conductive media.

Still another object of the invention is the provision of apparatus capable of measuring micrometric thicknesses of electrically conductive materials.

A further object is to provide apparatus for measuring the vibration of a rotating shaft and the thickness of the oil film in its bearings.

Another object is the provision of means to measure various media from one side thereof without the necessity of making mechanical or electrical connections to both sides of the media.

A still further object is to provide apparatus for phonographically reproducing sound.

Other objects will become apparent in the course of the following description when considered in connection with the annexed drawings in which:

Fig. 8 is a diagram of a cathode ray tube system for measuring the thickness of the oil film in the bearings of a rotating shaft and for providing a pattern of the vibrations of said shaft;

Fig. 9 illustrates the face of the cathode ray tube of Fig. 8; and

Figure 1:
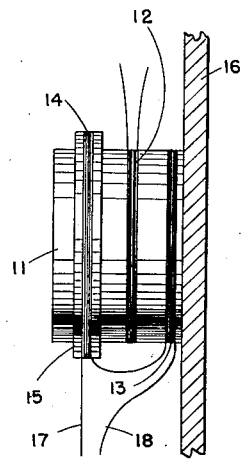
Fig. 1 is a side elevation of a coil arrangement employed as a part of the measuring apparatus.

Referring now to the drawings in which like parts in the different views are designated by like reference numerals, Fig. 1 shows a form 11, generally cylindrical in shape, but not necessarily so, and composed of a phenolic condensation product or any electrically insulating material, having wound in a groove therein a primary coil 12. In a groove at one end of the form 11, is wound a secondary coil 13 which is connected in series opposition with a buck-out coil 14 wound in a groove on an annular ring 15 slidable on the form 11 on the opposite side of the primary coil 12. Coils 12, 13 and 14 are substantially parallel to each other and to a non-magnetic, electrically conducting plate 16 when the form 11 is pressed thereagainst.

Figure 2:
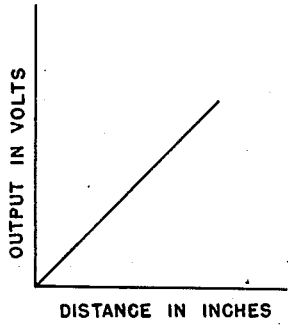
Fig. 2 is a graphical representation of the electrical characteristics of the coil arrangement of Fig. 1.

The method of operation of the apparatus so far disclosed will be described with particular reference to Fig. 2. Neglecting coils 13 and 14 for the moment and assuming that coil 12 is connected to a source of radio frequency current of two or three megacycles, the radio frequency field generated by coil 12 will induce in the conducting plate 16 a current which will in turn produce a radio frequency field opposing the generated field. If plate 16 were a perfect conductor, the resultant of the generated field and the induced field would be zero at the surface of the plate 16 facing coil 12, and a theoretical secondary coil having no thickness and placed at the surface of plate 16 would have no voltage induced therein. It has been found that as the secondary coil 13 is moved away from the surface of the plate 16 in the direction of primary coil 12, the induced voltage in the secondary coil increases in a substantially linear relationship with the distance of separation, as shown in the graph of Fig. 2, up to a distance equal to about five percent of the diameter of the coils. Thus the coils on a coil form one inch in diameter will micrometrically measure distances from 0 to 0.05 inch with a deviation from linearity of only a fraction of one percent.

Since it is impossible to secure a conducting plate which is electrically perfect and since a secondary coil of zero thickness exists only in theory, it is not possible to produce a zero resultant field at the surface of plate 16 or to measure such field, and it is obvious that the secondary coil 13 in Fig. 1 will have induced in it a voltage representative of the field intensity at a finite distance from the plate 16 even when the form 11 is pressed closely to the plate. However, this voltage may be reduced to zero by so adjusting ring 15 carrying buck-out coil 14 with respect to primary coil 12 that a voltage will be induced in coil 14 which is equal to and in opposition to that induced in secondary coil 13 so that the output of both coils 13 and 14, as it appears across leads 17 and 18, will equal zero.

Because of the linearity of the output from leads 17 and 18 with respect to the distance of the secondary coil 13 from the plate 16, the apparatus may obviously be used for measuring any electrically non-conductive material by separating form 11 from plate 16 and placing therebetween and in close contact therewith the material to be measured. The output from leads 17 and 18 will then be a measure of the dimensions of the gap between form 11 and plate 16 and therefore of the thickness of the material in the gap.

Figure 3:
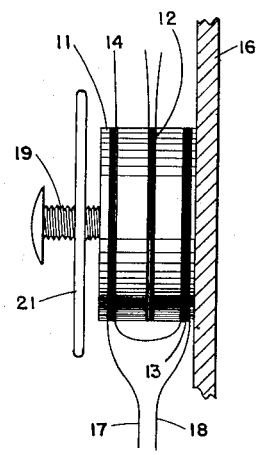
Fig. 3 is a side elevation of a modification of the coil arrangement of Fig. 1.

Fig. 3 shows a modification of the zero adjustment disclosed in Fig. 1. Instead of winding coil 14 on ring 15 as in Fig. 1, the coil 14 is permanently wound in a groove on form 11 and form 11 is provided with a threaded dielectric rod 19 on which is adjustably mounted a disc 21 made of silver, copper, aluminum, brass or any other highly conductive material. For obtaining the zero setting mentioned above, it is only necessary to place form 11 against plate 16 and rotatably adjust disc 21 so that it varies its distance from buck-out coil 14 until a setting is obtained such that the output of coil 14 is equal to the output of coil 13, and the voltage at leads 17 and 18 is zero because of the series opposition connection between coils 13 and 14. The apparatus employed for converting the output from leads 17 and 18 into an indication of distance will be more fully described hereinafter.

Figure 4:
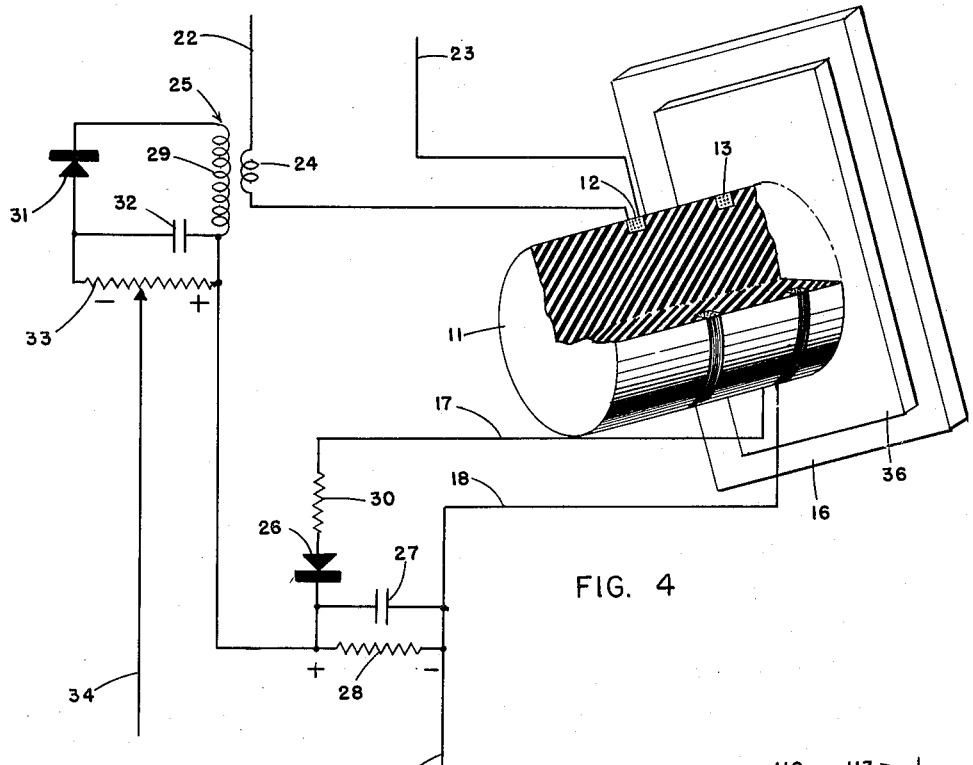
Fig. 4 is a diagram of a circuit adapted to be used with still another modification of the coil arrangement of Fig. 1 shown partly in section.

Fig. 4 illustrates a third modification of the invention. In this form, the buck-out coil is omitted and the output of the secondary coil is rectified, the zero setting being obtained by opposing the rectified current with a direct current which may be adjusted to any desired value. This is accomplished as follows:

Form 11, shown partly in section, is provided with a primary coil 12 connected to the radio frequency current supply by leads 22 and 23 which include in series therewith the primary winding 24 of a current transformer 25. Form 11 also has mounted thereon a secondary coil 13, the output leads 17 and 18 of which are connected to a peak rectifier comprising a tube diode or a type 1N34 germanium diode. The diode is illustrated by the symbol 26 and is connected across leads 17 and 18 in series with condenser 27, the condenser being shunted by a resistor 28 to complete the peak rectifier circuit. The elements 26 and 27 are generally mounted in form 11 so as to reduce the capacity between the leads 17 and 18 and prevent resonance of coil 13. Also for the purpose of reducing harmonic resonance, a resistor 30 is in series with condenser 27 and together they form a low pass filter to limit the current at resonance.

The transformer 25 is provided with a secondary winding 29 across which is also connected a peak rectifier similar to that previously described and comprised of diode 31, condenser 32 and resistor 33 having a variable tap thereon. The outputs across resistors 28 and 33 are connected in opposition so that the output of the two resistors, which appears across leads 34 and 35, may be adjusted to zero by the variable tap on resistor 33 when form 11 is pressed directly against plate 16. Thereafter, when a non-conductive object 36 to be measured is placed between plate 16 and form 11, the output from leads 34 and 35 will bear a linear relation to the thickness of the object.

The transformer 25 not only has the function of supplying an opposing direct current as described above but has the added highly desirable feature of providing compensation for variations in the radio frequency current supply lines 22 and 23 for, as the current rises, it is obvious that the output in leads 17 and 18 will rise in proportion but this will produce no error by reason of the proportionate increase in the bucking voltage simultaneously developed across resistor 33 when the output of transformer 25 increases.

Figure 5:
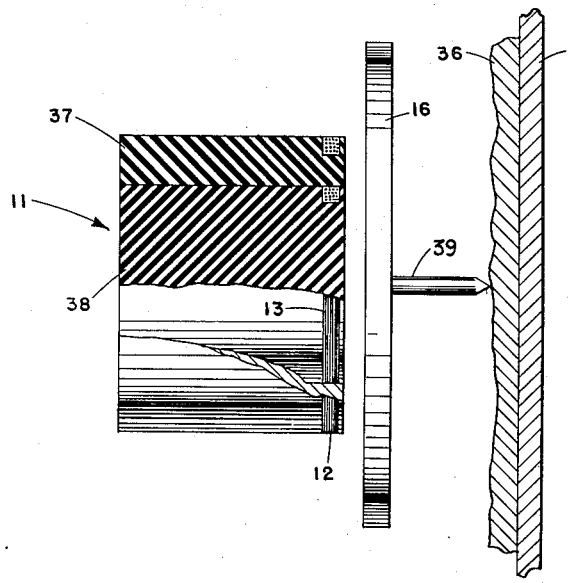
Fig. 5 shows still another variation of the coil arrangement with parts broken away and illustrates a method whereby the various coil arrangements can be employed for measuring the thickness of conducting materials.

Referring now to Fig. 5, this figure shows the preferred embodiment of form 11 and the coil arrangement mounted thereon. Form 11 is made in two concentric portions, an outer hollow cylindrical portion 37 carrying the primary coil 12 in a notch at one end thereof and an inner cylindrical portion 38 having a notch at one end in which the secondary coil 13 is mounted. The inner cylindrical portion 38 may be cemented within the outer portion 37 after assembly of the coils thereon or may be held therein by any suitable method. Because of the concentric arrangement of the primary and secondary coils and their close proximity to the plate 16 even when an object to be measured fills the intervening space, this arrangement is highly efficient because of the reduction in leakage and the close approximation to the theoretical ideal discussed hereinabove. It should also be pointed out at this time that the locations of the primary and secondary coils may be interchanged without greatly affecting the accuracy of the results obtained.

It has been found desirable to construct the preferred embodiment of Fig. 5 so that the outside diameter of the outer portion 37 of the form 11 is one inch and the inner portion 38 has an outside diameter of 0.75 inch so that the average diameters of the inside and outside coils bear a ratio of 68%. It is desirable to hold this ratio to within 2%. The primary coil 12 may be provided with five turns of No. 20 enamel-covered wire and the secondary coil 13 with fifty turns of No. 43 enamel-covered wire.

As so far described, each of the embodiments of the invention are suitable only for measuring electrically non-conductive media, as a conductive object or fluid can not be placed between form 11 and plate 16 without destroying the linearity of response of the apparatus by reason of the field which will be induced in the material being measured. Fig. 5, however, illustrates means for measuring conductive material. It has been found that when the plate 16 is more than 0.001 inch thick, it effectively attenuates the radio frequency field impinging on it so that no effect is produced on the surface of plate 16 opposite the form 11. To this surface is attached a stylus 39 which may be brought into contact with a fixed plate 41 leaving a gap between the plate 16 and form 11, the form also being mounted in a fixed position. The gap should be no greater than the maximum for which the apparatus gives linear results. If the rectified output of secondary coil 13 is now opposed by a direct current in the manner disclosed in connection with Fig. 4 so as to produce a resultant output of zero, an object 36 placed between stylus 39 and fixed plate 41 will cause movement of plate 16 towards fixed form 11 by an amount equal to the thickness of object 36 with the further result of changing the output of secondary coil 13 by a proportionate amount.

It is only necessary to reverse the output leads of the apparatus when employing the stylus 39 for moving the plate 16 for the reason that the output of the secondary coil will decrease with increase in the thickness of the object to be measured whereas in the previous arrangements, the output of the secondary coil increases with increases in the thickness of the object to be measured so that in the first case, the voltage being measured is the opposing voltage applied across the coil 13, minus the smaller voltage induced in the coil 13 and in the latter case, the voltage being measured is the voltage induced in the coil 13 minus the smaller opposing voltage applied across the coil 12.

Figure 6:
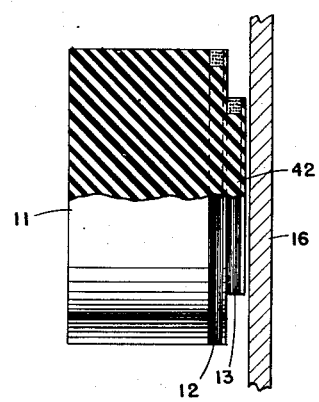
Fig. 6 shows a partial section through a fifth form of the coil arrangement.

Fig. 6 shows a section through still another modification in which the primary coil 12 and the secondary coil 13 are coaxial but not coplanar so that they may be mounted on a single form 11 having a projection 42 for receiving the secondary coil 13. The manner of use of this modification does not differ from those heretofore disclosed.

Figure 7:
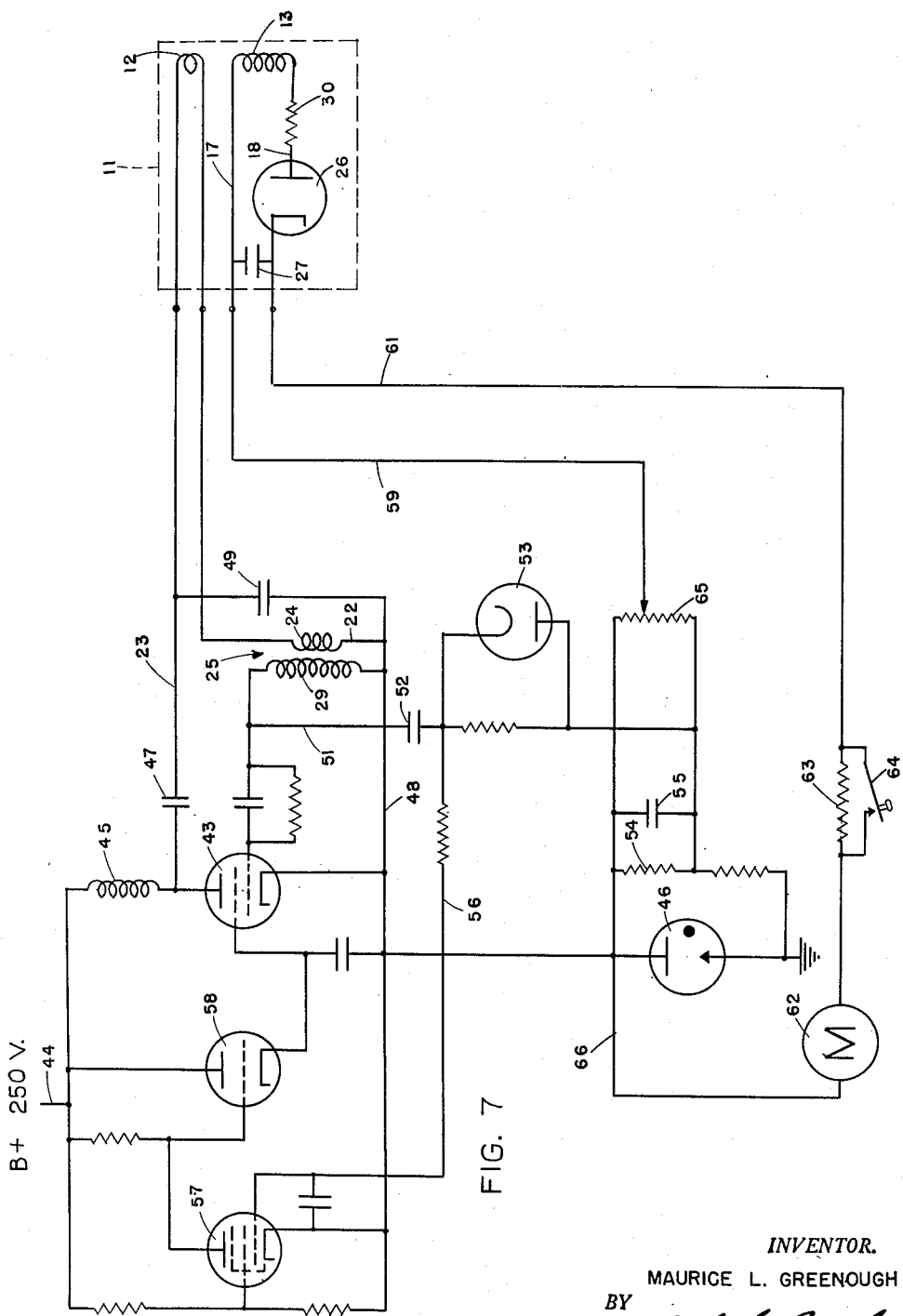
Fig. 7 is a diagrammatic representation of a complete circuit adapted to measure micrometric distances.

Fig. 7 is a diagrammatic showing of a complete circuit employed with the measuring apparatus previously disclosed, similar parts being designated by similar reference numerals. The form 11 is shown as a dotted rectangle enclosing the primary coil 12, the secondary coil 13, the resistor 30, the rectifier 26 and the condenser 27, all preferably mounted in the form for the reasons stated hereinabove.

The primary coil 12 is supplied with radio frequency current from an oscillator tube 43 having a plate supplied with direct current from the positive supply line 44 through a radio frequency choke 45, the cathode being connected through a voltage regulator tube 46 to ground. The plate of oscillator tube 43 is connected through the conventional blocking condenser 47 to one side of primary coil 12, the other side of which is connected through the primary winding 24 of current transformer 25 to the ground lead 48. Connected across the primary coil 12 and primary winding 24 is a condenser 49 which together with coil 12 and winding 24 forms the plate tank circuit of the oscillator tube 43. The secondary winding 29 of transformer 25 is connected to the grid of the oscillator tube 43 in a conventional manner to maintain its oscillations at the desired frequency.

It is desirable to hold the current output of oscillator 43 constant and this result is achieved by a unique regulation scheme. The output of the secondary winding 29 of current transformer 25 is connected through lead 51 and conventional blocking condenser 52 to a rectifier 53 which is connected in such a way to the resistor 54 connected across the voltage regulator tube 46 as to compare the rectified voltage from rectifier 53 with the substantially constant voltage of the voltage regulator tube 46. A condenser 55 connected across resistor 54 averages slight voltage variations across resistor 54. The resultant of the compared voltages is connected through lead 56 to the control grid of a direct current amplifier tube 57 in the conventional manner, the output of tube 57 being connected to the control grid of cathode follower tube 58 which has its cathode connected to the screen grid of the oscillator tube 43. By this means the current output of the oscillator is maintained substantially constant even though the line voltage or tube characteristics vary, especially since the regulator network has a loop gain of the order of 100 so that it is very sensitive to small variations in oscillator tube output.

The output of secondary coil 13 passes through the peak rectifier circuit comprised of elements 26, 27 and 30, as previously described, and appears across leads 59 and 61 as a direct current voltage. Lead 61 is connected to a milliammeter 62 through a multiplier resistor 63 which may be shunted out of the circuit by a switch 64. Lead 59 is connected to an adjustable resistor 65 connected across condenser 55 to provide a variable voltage in opposition to the voltage across leads 59 and 61. The circuit to the other side of milliammeter 62 is completed from one end of resistor 65 through lead 66.

The operation of the apparatus shown in Fig. 7 will be apparent from the description heretofore given but a brief resume thereof will be repeated. When the power supply from supply line 44 is connected, the oscillator tube 43 begins to generate a predetermined radio frequency current which is preferably of the order of between two and three megacycles. The output current of the oscillator tube is held substantially constant by rectifier 53, amplifier 57 and cathode follower tube 58 regardless of any factor which tends to produce variation of the output. The form 11, which may also be termed a probe, is pressed against the surface of a non-magnetic conducting plate which is to form the surface upon which objects to be measured are to be placed. The rectified output of secondary coil 13 is indicated on the dial of milliammeter 62 and the reading of milliammeter 62 is reduced to zero by adjusting resistor 65 until it places across leads 59 and 61 an opposing voltage which is exactly equal to that placed on these leads by coil 13, this opposing voltage being held substantially constant by voltage regulator 46 and its associated network.

When a measurement is to be made, the form 11 is removed from the conducting plate and the object to be measured is placed between the probe and the plate. The secondary coil 13 will then have an increased voltage produced therein which bears a linear relation to the distance between the probe and the plate, and this will manifest itself as a reading on the dial of milliammeter 62. When properly calibrated, the milliammeter will give direct readings in thousandths of an inch. If the object is a very thin film, the readings may be multiplied by shunting, by means of the switch 64, the resistor 63 from the milliammeter circuit, the resistor 63 being of a value which will preferably give a ten-to-one ratio of multiplication. Once the zero reading of the milliammeter has been set, other non-conductive objects having various thicknesses may be placed between the form and the conducting plate and the milliammeter will give a direct reading of the thickness within the limits of the design of the equipment.

Referring now to Figs. 8 and 9, these figures disclose the application of the equipment of Fig. 7 to the measurement of the thickness of the oil film in the bearing of a rotating shaft and the rotation pattern of the shaft due to unbalance therein, like parts being designated by like reference numerals in Figs. 7, 8 and 9.

The shaft 67 of a turbine or electric motor, which is shown in end elevation, is generally made of steel or other ferro-magnetic material and is therefore not suitable as a base plate to be employed in conjunction with the probe of this invention for measuring purposes, as a magnetic conductor will produce a distortion in the field induced by the probe. However, as pointed out hereinbefore, the generated field of the primary coil will penetrate a conducting material to a depth of not more than 0.001 inch so that it is only necessary to plate a copper annulus around the shaft to a depth of 0.001 inch in order to eliminate the distortion created by the material of the shaft.

The copper annulus has placed adjacent thereto four probes B, R, T, and L, shown schematically, having primary coils 68, 69, 71 and 72 thereon and spaced from each other by ninety degrees around the shaft 67. The primary coils are connected in series to the oscillator 43 by means of leads 22 and 23, the oscillator 43 being regulated by tubes 53, 57 and 58 as disclosed in Fig. 7. The secondary coils 73, 74, 75 and 76 of the respective probes B, R, T and L are each connected in a similar manner to the measuring network so that it is deemed necessary to specifically show and describe the connections of only one of the secondary coils 73.

Coil 73 is connected to a full-wave peak rectifier circuit comprised of a duo-diode 77 and condensers 78 and 79 arranged in a conventional manner to provide a direct current output across leads 81 and 82 connected to resistor 83. The voltage across resistor 83 is connected in opposition to the voltage across an adjustable resistor 84 for the purpose of setting the zero reading of the apparatus.

Instead of employing a milliammeter for indicating the changes in output of the secondary coils 73, 74, 75 and 76 as was done in the apparatus of Fig. 7, a cathode ray tube 85 is substituted therefor for reasons which will become apparent as the description proceeds. The cathode ray tube 85 is provided with a conventional cathode 86, grid 87, and first anode 88 connected to a supply line 89, as shown. It will be noted that the supply for the cathode ray tube 85 is in series with the adjustable resistor 84 and extends from the positive side of the source C+ through lead 48, resistor 84, supply line 89, to the negative side of the source C—. Thus, any fluctuation in the voltage of the cathode ray tube supply will appear across resistor 84 and simultaneously compensate the resultant of the voltages across resistors 83 and 84 for a reason to be hereinafter more fully disclosed.

Lead 82 is connected to one end of an adjustable resistor 91 having its other end grounded, a tap on this resistor being connected by lead 92 to the deflecting plate Ba which is one of a conventional set of four deflecting plates Ba, Ra, Ta and La mounted in the cathode ray tube 85. The plates Ra, Ta and La are connected in a similar fashion (not shown) respectively to the secondary coil 74 of probe R, the secondary coil 75 of probe T, and the secondary coil 76 of probe L, adjustable resistors 93, 94 and 95 being connected in each of the circuits for the same purpose which resistor 84 performs in the operation of secondary coil 73. Tube 85 is also provided with conventional accelerating anodes 90 and 100.

In front of the screen of the cathode ray tube is adjustably mounted, in an annular grooved guide ring 96, a circular transparent plate 97, preferably made of an acrylic or vinyl resin compound, and having thereon indicia lines 98 parallel to each other, as shown, about a center point 99. The plate 97 is provided with a handle 101 for rotatably adjusting its position in the guide 96, the plate 97 also being provided with an indicator hand 102 perpendicular to lines 98 and which cooperates with indicia 103 on the annular surface of the guide ring 96 to indicate the angle which lines 98 make with respect to the cathod ray tube 85.

The operation of the apparatus of Figs. 8 and 9 will now be described. Before any oil is placed in the bearing supporting shaft 67, the shaft is shimmed up with easily removable shims of any suitable material to its center position with respect to the bearing. Each of the probes B, T, R and L is then pressed against the shaft for the purpose of producing the zero adjustment of the cathode ray tube 85. This is accomplished by individually adjusting each of the adjustable resistors 84, 93, 94 and 95 in turn while only its related probe circuit is energized so that the voltage adjustment supplied by each of resistors 84, 93, 94 and 95 is opposed to that across its related resistor 83, the deenergization of the probe circuits not required to be energized being obtained by any expedient such as by opening the connections to the deflector plates. The zero adjustment of each probe will be indicated on the cathode ray tube 85 by the cathode spot on the tube end matching the zero point 99 on the transparent plate 97, as it will be obvious that no deflecting voltage will be applied to any of the deflecting plates of cathode ray tube 85 when the voltage across each resistor 83 is properly balanced.

After the apparatus is given the proper zero adjustment, each probe is moved away from the shaft by a distance equal to the desired thickness of the oil film, this being measured by the cathode spot for each individual probe when shims of known thickness are placed between the shaft and the probe while the remaining probe circuits are deenergized in the manner described hereinbefore. The shims which hold the shaft in center position are now removed and the bearing filled with oil, gravity causing the shaft to drop in the bearing towards the probe B and away from the probe T. When the distance between probe B and the shaft is reduced, the voltage drop across resistor 83 is reduced as explained in connection with Fig. 1 and as this voltage is connected in opposition to the voltage drop in the resistor 91, the grounded end of which is positive, the voltage on deflecting plate Ba of the cathode ray tube 85 rises and causes a downward deflection of the spot on the end of the cathode ray tube. Simultaneously, when the distance of the probe T from the shaft 67 is increased, the voltage on deflecting plate Ta decreases and this assists in the downward deflection of the cathode spot, its deflection being equal to the sum of the deflections caused individually by deflecting plates Ba and Ta.

If the shaft and all members mounted thereon were in perfect rotational balance, which is of course impossible, rotation of the shaft would not affect the position of the cathode spot as only gravity and no other force would be acting on the shaft to cause displacement thereof. However, as a practical matter, the shaft is caused to vibrate as it rotates due to a number of unbalanced forces acting upon it such as centrifugal force by reason of mechanical unbalance, magnetic pull by reason of electrical unbalance between armatures and field structures associated with the shaft, and variable windage forces, to name but a few. These forces, along with gravity, will add and subtract vectorially to produce a complex shaft vibration. The vibration will vary the outputs of the probes and will manifest itself on the end of the cathode ray tube by an irregular pattern 104 which will generally be the same under a fixed set of conditions but will vary with load and speed.

In order to be certain that the pattern 104 does not vary with variations in tube characteristics or voltage supply, the apparatus is provided with regulating tubes 53, 57 and 58 connected up and functioning in substantially the manner disclosed in connection with Fig. 7 and no further explanation thereof is deemed necessary. Further compensation is provided by tying the voltage supply line 89 for the cathode ray tube 85 to the variable adjusting resistors 84, 93, 94 and 95 so that the supply line 89 acts as the master balancing voltage supply not only for the adjusting resistors but for the regulating rectifier 53. Thus, if the voltage of line 89 should change, this change would affect the grid 87 of the cathode ray tube 85 and the anode 88 to change the acceleration of the cathode ray beam thereby to tend to change the displacement of the cathode spot at the end of the tube. However, a change in voltage of line 89 would simultaneously change the voltage drop across the resistors 84, 93, 94 and 95 thereby changing the voltage on deflecting plates Ba, Ta, Ra and La in such a direction as to compensate for the change in acceleration of the cathode ray beam and maintain the pattern 104 in its initial orbit.

If the oil film in the bearings should thin out, the shaft 67 would approach closer to probe B and this would manifest itself on the cathode ray tube 85 by a downward shift in the pattern 104. Knowing the initial setting of each probe as described above, it will become obvious when the shaft is beginning to approach dangerously close to the bearing.

The actual distance between the shaft and the bearing at any angle can be determined by grasping handle 101 on the plate 97 and rotating the plate until the indicator hand 102 points at the angle desired on the guide ring 96. It is then only necessary to count the lines 98 from the center point 99 to the pattern 104 and, if the spacing of the lines is known in inches, the distance of the shaft from the bearing will equal the known separation at the time the probes were first set minus the reading taken above. In order to calibrate the spacing of lines 98, at the time of first setting of the probes with respect to the shaft by inserting shims of known thickness therebetween, the adjustable resistor 91 is set so that the cathode ray beam is displaced by a definite number of lines per 0.001 inch. The resistor 91 may also be employed as a multiplier by arranging taps thereon to give five or ten times the displacement normally obtained so that an enlarged pattern may be viewed where very small measurements are to be read.

Figure 10:
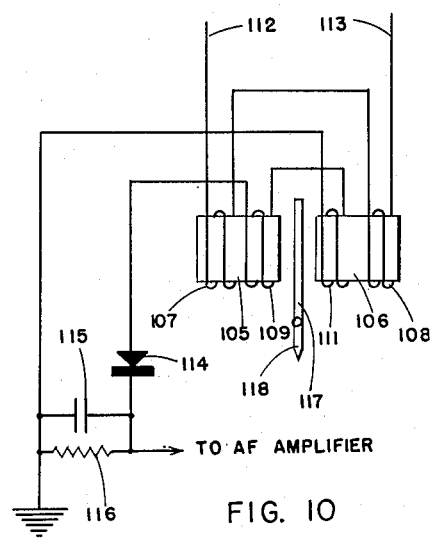
Fig. 10 shows a phonograph pick-up embodying the principles of the invention.

Referring now to Fig. 10, the use of the probe arrangement as a phonograph is illustrated diagrammatically. A pair of forms 105 and 106 are provided with respective primary coils 107 and 108, and secondary coils 109 and 111. The primary coils are connected in series to leads 112 and 113 fed with radio frequency current from any source of supply (not shown). The secondary coils are connected in series opposition to a peak rectifier comprised of a germanium crystal or other diode 114 and a condenser 115, the rectified output appearing across a resistor 116 which is connected to the input of an audio amplifier (not shown). Between forms 105 and 106 is pivotally mounted a nonmagnetic metal vane 117 carrying a phonograph needle 118.

The operation of the phonograph pick-up is obvious. The needle 118 is placed in the groove of a phonograph record and vibration of the needle is transmitted to vane 117 which varies its distance from the forms 105 and 106 in consonance with such vibration. The changes in distance cause variation in the output of secondary coils 109 and 111 and after rectification of the output a varying direct current voltage will appear across resistor 116 which is a counterpart of the sound waves recorded on the phonograph record. This voltage may therefore be fed directly to an audio amplifier and thence to a loud speaker wherein the recorded waves are reproduced as sound.

If desired, the leads 112, 113 may be connected to an oscillator having a frequency within the broadcast band and the output from the secondary coils can be connected to the antenna input of a broadcast receiver to cause reproduction of the modulated signals from the secondary coils.

The systems and arrangements above described by no means exhaust the possible applications of the principles involved but are merely illustrative thereof. Accordingly, it is anticipated that numerous applications of these principles will occur to those skilled in the art. The scope of the invention is defined in the following claims.

The invention described herein may be manufactured and used by or for the Government of the United States of America for governmental purposes without the payment of any royalties thereon or therefor.

What is claimed is:

1. A phonograph pick-up comprising a pair of spaced forms in axial alignment, a primary coil on each form, means for supplying radio frequency current to said primary coils, the coils being connected in series with said supply means, a secondary coil on each form, the secondary coils being connected in series, and a vane of non-magnetic electrically conducting material pivotally mounted in the space between the forms and adapted to carry a stylus thereon.

2. The phonograph pick-up of claim 1 having means to rectify the output of the series connected secondary coils, an audio frequency amplifier connected to the rectifying means, and a loud speaker energized by said amplifier.

3. The phonograph pick-up of claim 1 provided with a super-heterodyne radio receiver, and means to connect the series connected secondary coils to the radio frequency input terminals of said receiver.

4. Apparatus for micrometrically measuring the thickness of a material comprising a non-magnetic electrical conducting plate bearing a stylus adapted to contact said material, a form adjacent the plate, a primary coil mounted on the form, means for supplying radio frequency current to the primary coil, a secondary coil having an output circuit mounted on the form, said coils facing the plate, means for rectifying the current in said output circuit, means connected in the output circuit for opposing the rectified current with a direct current to adjust the current in the output circuit to a predetermined value, and means for measuring the current in the output circuit.

5. The method of measuring small distances which comprises aligning one surface of a nonmagnetic electrically conductive member with one limit of a distance to be measured, generating an alternating electro-magnetic field at a source positioned a predetermined point with respect to said limit so that a portion of the flux of said field impinges against the adjacent surface of the member, said generated magnetic field having a frequency of such magnitude that it is attenuated at the surface of the member and induces an opposing magnetic field substantially at the surface of said member, said fields producing a resultant magnetic field whose intensity varies linearly over a distance from said member greater than the distance to be measured, causing the resultant magnetic field existing at said limit to generate a potential, subjecting said generated potential to a bucking potential of sufficient magnitude to reduce the effect of the potential generated at said limit to zero, positioning said non-magnetic member at the other limit of the distance to be measured whereby the effect of the induced magnetic field on the generated field decreases, and then measuring at a second predetermined point the potential generated by the resultant magnetic field existing at the other limit of said distance in terms of the linear dimension of the distance to be measured.

6. An apparatus for measuring small distances under circumstances where it is not possible to make electrical or mechanical contact with both limits of such a distance, which comprises a form, a primary coil secured on the form intermediate the ends thereof, means for supplying radio frequency current to the coil to generate a radio frequency magnetic field, a pickup coil secured at one end of said form, a bucking coil secured on the opposite end of the form and electrically connected in series opposition to the primary coil, said generated field inducing a voltage in the bucking coil, a non-magnetic electrically conductive plate positioned normally against the end of the form adjacent to the pickup coil so that the generated magnetic field impinges against the surface of the plate and induces an opposing magnetic field at said surface, said opposing magnetic field producing a resultant magnetic field which induces a voltage in said pickup coil, means provided on the form for adjusting the voltage induced in the bucking coil to a value equal to the voltage induced in the pickup coil by the resultant field when the pickup coil abuts the end of the form, said primary coil and the plate being so arranged that the intensity of the resultant field varies linearly for a distance from the plate greater than the distance to be measured, and means for measuring the output voltage of the pickup coil, whereby when the plate is positioned away from said end of the form a distance equal to the distance to be measured the output voltage increases by an amount directly proportional to the increase in the linear distance between the pickup coil and the plate.

7. An apparatus for measuring small distances, which comprises a non-magnetic electrically conductive member designed to be positioned so that one face of the member is aligned with one limit of a distance to be measured, means for generating a radio frequency field at a predetermined point with respect to the member so that the magnetic field impinges the face of the member at said limit, said generated field being substantially attenuated by the member and inducing an opposing magnetic field on the surface of the member at said limit, flux responsive means positioned adjacent to said limit for measuring the intensity of the resultant magnetic field existing at said limit, said member and radio frequency field being so designed that the resultant magnetic field varies linearly with respect to the distance between the member and the measuring means, and adjustable means responsive only to the generated field for reducing the effect of the resultant field on the measuring means to zero at said limit, whereby when the member is positioned at the opposite limit of said distance to be measured the linear dimension of the distance to be measured is determined by the intensity of the resultant field at the opposite limit of said distance.

8. An apparatus for measuring small distances under circumstances where it is not possible to make electrical or mechanical contact with both limits of such a distance, which comprises a form, a primary coil secured on the form intermediate the ends thereof, means for supplying radio frequency current to the coil to generate a radio frequency magnetic field, a pickup coil secured at one end of said form, a non-magnetic electrically conductive plate normally positioned against the end of the form adjacent to the pickup coil so that the generated magnetic field impinges against the surface of the plate and induces an opposing magnetic field at said surface, said opposing magnetic field producing a resultant magnetic field which induces an alternating potential across the output terminals of said pickup coil, means connected to the pickup coil for rectifying the alternating potential in the pickup coil to a D. C. potential, means for applying a D. C. potential across said rectifying means so as to render the output D. C. potential of the pickup coil equal to zero when the pickup coil abuts the end of the form, said primary coil and the plate being so arranged that the intensity of the resultant field varies linearly for a distance from the pickup coil greater than the distance to be measured, and means for measuring the output voltage of the rectifying means, whereby when the plate is positioned away from said end of the form a distance equal to the distance to be measured the output voltage of the rectifying means increases by an amount directly proportional to the increase in the intensity of the resultant magnetic field.

9. An apparatus for measuring small distances under circumstances where it is not possible to make electrical or mechanical contact with both limits of such a distance, which comprises a form, a primary coil secured on the form intermediate the ends thereof, means for supplying radio frequency current across the primary coil to generate a radio frequency magnetic field, a pickup coil secured at one end of said form, a non-magnetic electrically conductive plate positioned normally against the end of the form adjacent to the pickup core so that the generated magnetic field impinges against the surface of the plate and induces an opposing magnetic field at said surface, said opposing magnetic field producing a resultant magnetic field which induces an alternating potential across the output terminals of the said pickup coil, means connected to the output terminals of the pickup coil for rectifying the potential induced in the coil to a D. C. potential, means responsive to the radio frequency current for applying a D. C. potential across the rectifying means sufficient to reduce the output of the pickup coil to zero when the pickup coil abuts the end of the form, said primary coil and the plate being so arranged that the intensity of the resultant field varies linearly as the plate is moved away from the pickup coil a distance greater than the distance to be measured, and means for measuring the output voltage of the rectifying means, whereby when the plate is spaced away from said end of the form a distance equal to the distance to be measured the magnitude of the output voltage increases by an amount directly proportional to the increase in the linear distance between the pickup coil and the plate.

10. The apparatus of claim 8 in which the rectifier is mounted in the form thereby to reduce the capacity of said output circuit.

11. The apparatus of claim 8 having means responsive to the radio frequency current supply means for maintaining the amplitude of the radio frequency supply constant.

12. The apparatus of claim 8 wherein the means for supplying radio frequency current is an oscillator, voltage supply means for said oscillator, and means responsive to voltage variations in the voltage supply means to control said oscillator for maintaining the amplitude of the radio frequency current supply constant.

13. The apparatus of claim 8 wherein the means for supplying radio frequency current is an oscillator, voltage supply means for said oscillator, and means responsive to the radio frequency current supply means and to voltage variation in the voltage supply means to control said oscillator for maintaining the amplitude of the radio frequency current supply constant.

14. The method of measuring the vibration of a ferro-magnetic rotating shaft, which comprises providing a layer of non-magnetic electrically conductive material around the periphery of a selected portion of such a shaft, generating an alternating frequency at a source positioned a a predetermined distance from the axis of rotation of the shaft so that the field impinges the non-magnetic material, said generated field having a frequency designed to induce an opposing magnetic field only on the outer surface of the non-magnetic material, said fields producing a resultant magnetic field whose intensity varies linearly throughout a distance from said shaft greater than the movement of the shaft when it is rotated, and measuring the intensity of the resultant magnetic field at a fixed point with respect to surface of the non-magnetic material to determine the degree of movement of the shaft with respect to the source of the magnetic field when the shaft is rotated.

15. The method of measuring the vibration of ferro-magnetic rotating shaft, which comprises generating a radio frequency electro-magnetic field at a plurality of sources equally spaced about the central axis of such a shaft, providing a layer of non-magnetic, electrically conductive material around the shaft, said generated magnetic fields impinge against the outer surface of said non-magnetic layer, said layer being designed to attenuate the generated fields so that said fields induce opposing magnetic fields at corresponding points about the surface of the layer, said generated fields and induced fields being such that the intensity of the resultant magnetic field at each point adjacent to said non-magnetic surface varies linearly within limits greater than the amount of radial movement of the shaft due to rotation, and measuring the intensity of the resultant magnetic field at each of said points to determine the amount of radial movement.

16. An apparatus for measuring the vibration of a rotating shaft, which comprises a primary coil spacedly positioned adjacent to such a shaft so that the central axis of the coil is perpendicular to the axis of rotation of the shaft, means for supplying a radio frequency current to the coil to generate a radio frequency magnetic field in the space between the coil and the shaft, means engaged by the shaft for attenuating the magnetic field at a predetermined point with respect to the periphery of the shaft, said generated field inducing an opposing magnetic field on the surface of the attenuating means which causes a resultant magnetic field to exist between the primary coil and the attenuating means, a secondary coil positioned at a fixed point with respect to the attenuating means so that the resultant magnetic field induces an alternating potential therein; adjustable means for applying a potential to said secondary coil equal in magnitude but of opposite polarity to the potential induced in the primary coil when the shaft is not rotating, said generated field and attenuating means being so designed that the intensity of the resultant magnetic field varies linearly within limits greater than the radial movement of the shaft due to the rotation thereof, and means for measuring the output potential of the secondary coil, whereby when the shaft is rotated the amount of vibration thereof may be determined directly from the corresponding variations in the output potential of the measuring means.

17. An apparatus for measuring the vibration of a rotating shaft, which comprises a primary coil spacedly positioned adjacent to such a shaft so that the central axis of the coil is perpendicular to the axis of rotation of the shaft, means for supplying a radio frequency current to the coil to generate a radio frequency magnetic field in the space between the coil and the shaft, means engaged by the shaft for attenuating the magnetic field at a point predetermined with respect to the periphery of the shaft, said generated field inducing an opposing magnetic field on the surface of the field attenuating means, which produces a resultant magnetic field between the attenuating means and the primary coil, a secondary coil positioned at a fixed point with respect to the attenuating means so that the resultant magnetic field induces an alternating potential therein, means connected to the secondary coil for rectifying the induced alternating potential to a D. C. potential; adjustable means for applying a D. C. potential to said secondary coil equal in magnitude but of opposite polarity to the potential induced in the primary coil when the shaft is not rotating, said generated field and attenuating means being so designed that the intensity of the resultant magnetic field varies linearly within limits greater than the radial movement of the shaft due to the rotation thereof, and means for measuring the output potential of the secondary coil, whereby when the shaft is rotated the amount of vibration thereof may be determined directly from the corresponding variations occurring in the output potential measured by the measuring means due to movement of the attenuating means with respect to the primary coil.

18. An apparatus for measuring the vibration of a rotating shaft, which comprises four primary coils equally spaced about the periphery of such a shaft so that the central axis of each coil is perpendicular to the axis of rotation of the shaft, means for supplying a radio frequency current individually to the coils to generate a radio frequency magnetic field in the space between the coil and the shaft, means engaged by the shaft for attenuating the magnetic field of each coil at a predetermined point with respect to the periphery of the shaft, said generated fields inducing opposing magnetic fields on the surface of the field attenuating means which produces a resultant magnetic field between its respective primary coil and associated attenuating means, said generated fields and attenuating means being so designed that the intensity of the resultant magnetic fields varies linearly throughout a distance from its respective attenuating means greater than the radial movement of the shaft due to the rotation thereof, four secondary coils positioned at fixed points with respect to the attenuating means so that the resultant magnetic fields induce an alternating potential in their respective coils, means for rectifying the alternating potential induced across the terminals of each secondary coil to a D. C. potential, adjustable means for applying a D. C. potential to each secondary coil equal in magnitude but of opposite polarity to the potential induced in its respective primary coil to render the output potential of each coil equal to zero when the shaft is not rotating, and a cathode ray device having its vertical and horizontal beam deflecting plates connected to the output terminals of the secondary coils, one coil being connected to one of the plates, for indicating the amount of vibration of the shaft resulting from variations in the output potential of the coils due to the movement of the shaft when it is rotated.

19. An apparatus for micrometrically measuring the vibration of an article, which comprises a non-magnetic, electrically conductive plate mounted slidably with respect to an article whose vibration is to be measured, a stylus attached to one face of the plate so as to render the plate responsive to any movement of the article, a primary coil positioned spacedly with respect to the opposite face of the plate so that its central axis is perpendicular to said face of the plate, means for supplying an alternating current to the coil having a frequency of at least three megacycles, said current generating an electromagnetic field which impinges on the plate and induces an opposing magnetic field only on the surface of the plate, a secondary coil having its central axis aligned with the axis of the primary coil and positioned at a fixed point with respect to said plate, said coil having an alternating potential induced therein by the resultant magnetic field, said generated field and plate being so designed that the intensity of the resultant magnetic field varies linearly from said plate for a distance greater than the vibratory movement of the article, means for converting said induced alternating potential to D. C. potential, and means for applying a D. C. potential of equal and opposite polarity across the secondary coil to reduce the output of said coil to zero when the article is at rest, whereby when the article vibrates the corresponding movement of the plate changes the output of the secondary coil by an amount equal to the movement of the article.

20. The method of measuring small distances in instances where it is not possible to make electrical or mechanical connections at both limits of the distance to be measured, which comprises positioning a non-magnetic electrically conductive member in predetermined relationship with respect to one of the limits of the distance to be measured, generating an alternating electro-magnetic field at a source located at a first predetermined distance from the member in such a position that the magnetic field impinges on the adjacent surface of said member, said generated field having a frequency of sufficient magnitude to induce an opposing magnetic field only at said adjacent surface of the member, said fields producing a resultant magnetic field whose intensity varies linearly throughout a distance from said member equal at least to the distance to be measured, measuring the magnitude of the resultant magnetic field at a second predetermined point with respect to said surface of the member, varying the space between the source of the generated field and the member so that the member is positioned at a predetermined point with respect to the opposite limit of the distance to be measured, and measuring the magnitude of the resultant magnetic field produced by said change in position of said member at said second predetermined point, whereby the linear dimension of the distance to be measured is determined from the difference in the intensity of the resultant field measured at each position of the member with respect to source of the generated field.

21. The method of measuring small distances under circumstances where it is not possible to make electrical or mechanical connections at both limits of the distance to be measured, which comprises generating an alternating frequency electromagnetic field from a first fixed point, attenuating the electro-magnetic field at a second predetermined point with respect to one of the limits of the distance to be measured, producing an opposing magnetic field having its source positioned at said second point at which the generated field is attenuated, said opposing field having an intensity at its source less than that of the generated field at said second point so as to produce a resultant magnetic field whose intensity varies linearly between limits spaced apart a distance greater than the limits of the distance to be measured, measuring the intensity of the resultant magnetic field at a third fixed point with respect to the generated field, varying the spacing between said generated field and the opposing field by an amount equal to the distance to be measured, and measuring the resultant magnetic field existing at said third fixed point, whereby the linear distance of the distance to be measured may be determined from the difference in the intensity of the resultant magnetic field caused by variations in the spacing between the opposing field and the generated field.

22. An apparatus for measuring small distances under circumstances where it is not possible to make electrical or mechanical connections at both limits of the distance to be measured, which comprises a non-magnetic, electrically conductive member movable longitudinally a distance greater than the distance to be measured, a first means positioned at a predetermined point with respect to said member for generating an alternating magnetic field so that it impinges on one surface of the member, said generated field having a frequency of such magnitude that it is substantially attenuated at the surface of the member and induces an alternating field on the surface of the member opposing the generated field, said induced magnetic field having an intensity such that a resultant magnetic field is produced adjacent to said member having an intensity which varies linearly throughout a distance from said member greater than the limits of the distance to be measured, and a second flux responsive means positioned at a fixed point with respect to the movable member for measuring the intensity of the resultant magnetic field, whereby when the member occupies positions with respect to the generated field corresponding to the limits of the distance to be measured the linear value of the distance to be measured may be determined directly from the difference in the intensity of the resultant magnetic field measured at each of said positions of the member.

23. An apparatus for measuring small distances under circumstances where it is not possible to make electrical or mechanical contact with both limits of such a distance which comprises, an electrically insulating form, a primary coil secured to said form, means for supplying radio frequency current to the coil to generate a radio frequency magnetic field, a pickup coil secured on said form, a non-magnetic electrically conductive plate positioned normally against the end of the form adjacent said pickup coil so that the generated magnetic field impinges against the surface of the plate and induces an opposing magnetic field at said surface, said opposing magnetic field producing a resultant magnetic field which induces a voltage in said pickup coil, and means for measuring the output voltage of the pickup coil, whereby when the plate is positioned away from said end of the form a distance equal to the distance to be measured the output voltage varies by an amount directly proportional to the increase in the linear distance between the pickup coil and the plate.

MAURICE L. GREENOUGH.

REFERENCES CITED

The following references are of record in the file of this patent:

UNITED STATES PATENTS

| Number | Name | Date |
| --- | --- | --- |
| 1,126,027 | Jullig | Jan. 26, 1915 |
| 1,815,717 | Kranz | July 21, 1931 |
| 2,111,210 | Ebel | Mar. 15, 1938 |
| 2,116,119 | Loewenstein | May 3, 1938 |
| 2,215,148 | Ehler | Sept. 17, 1940 |
| 2,217,843 | Langer | Oct. 15, 1940 |
| 2,237,254 | Broekhuysen | Apr. 1, 1941 |
| 2,307,649 | Turner | Jan. 5, 1943 |
| 2,353,211 | Zuschlag | July 11, 1944 |
| 2,396,540 | Stansfield | Mar. 12, 1946 |
| 2,399,635 | Hope | May 7, 1946 |
| 2,400,953 | Roys | May 28, 1946 |
| 2,411,501 | Brubaker | Nov. 26, 1946 |
| 2,431,841 | Storm | Dec. 2, 1947 |
| 2,503,851 | Snow | Apr. 11, 1950 |
| 2,557,393 | Rifenbergh | June 19, 1951 |

OTHER REFERENCES

Industrial and Engineering Chemistry, June 1945, pages 389–393, article by Alexander et al.